Sept. 14, 1965  J. E. BALLMER ETAL  3,205,738
FIBER BUNDLE MANUFACTURING
Filed Sept. 4, 1963  2 Sheets-Sheet 1
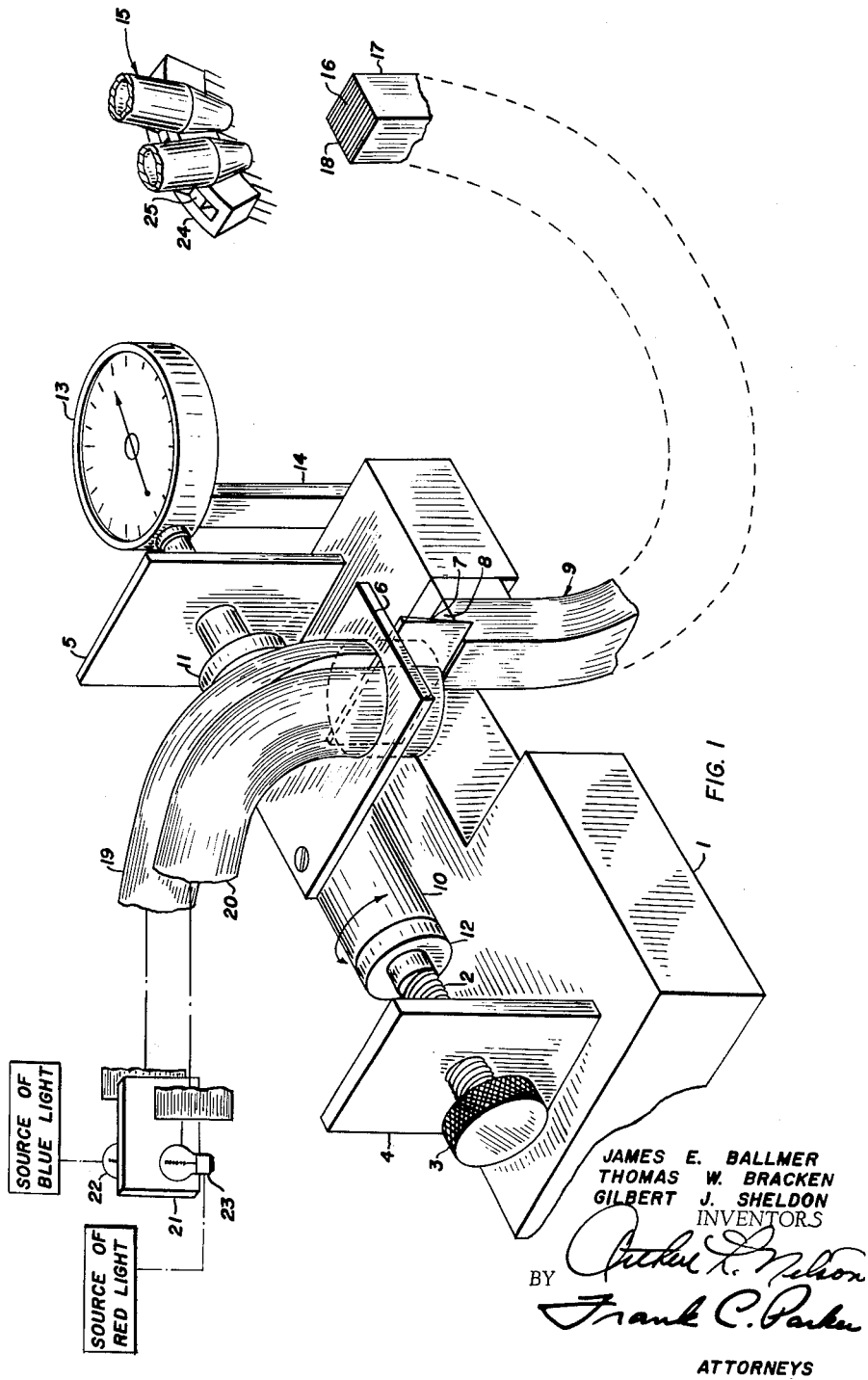
JAMES E. BALLMER
THOMAS W. BRACKEN
GILBERT J. SHELDON
INVENTORS
BY
ATTORNEYS Sept. 14, 1965  J. E. BALLMER ETAL  3,205,738
FIBER BUNDLE MANUFACTURING
Filed Sept. 4, 1963  2 Sheets-Sheet 2
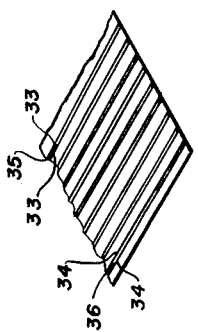
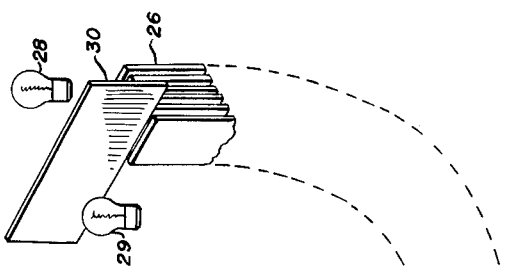
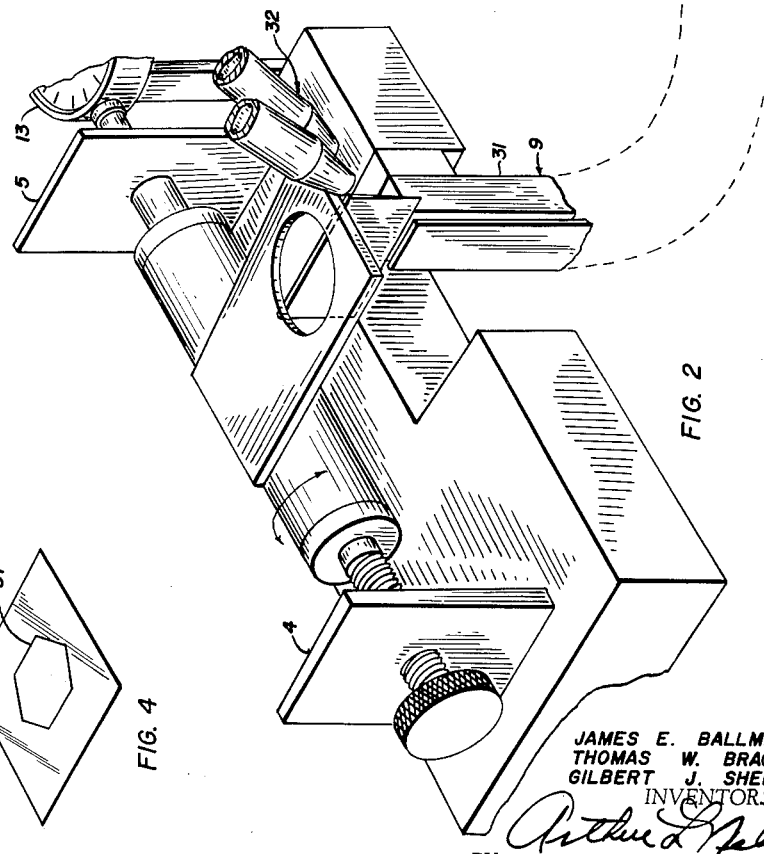
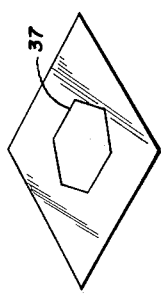
JAMES E. BALLMER
THOMAS W. BRACKEN
GILBERT J. SHELDON
INVENTORS
BY
ATTORNEYS United States Patent Office 3,205,738
Patented Sept. 14, 1965

3,205,738
FIBER BUNDLE MANUFACTURING
James E. Ballmer, Chili, and Thomas W. Bracken and Gilbert J. Sheldon, Irondequoit, N.Y., assignors to Bausch & Lomb Incorporated, Rochester, N.Y., a corporation of New York
Filed Sept. 4, 1963, Ser. No. 306,435
9 Claims. (Cl. 83—13)

This invention relates to fiber bundle manufacture and more particularly to a means and a method of severing lateral segments from a bundle of fibers.

During the initial steps in the manufacture of fiber bundles, the bundle is formed by placing a plurality of fibers in parallel closely packed relationship to form a bundle. Subsequently the end portions of these bundles are processed in a manner to permanently fix the end portions of the fibers relative to each other and form a light transmitting surface to receive and project light rays to and from the bundle.

A further processing of the bundle is necessary to provide a desired end configuration to adapt the bundle to the specific use to which it is intended. Accordingly, this invention is to provide a means for severing lateral segments of the end portion of the bundle. This includes among others, cutting parallel slices to form light transmitting slits in the bundle, or providing the desired configuration on the end of the bundle to adapt the end portion of the bundle for reception within a suitable casing.

It is an object of this invention to sever lateral segments on an end portion of a bundle of fibers.

It is another object of this invention to split sections of a predetermined size and shape from the end portions of a bundle of fibers and include both ends of any fibers common to sub-sections of the bundle.

It is a further object of this invention to provide an illuminating means directing light on an end of a bundle which may be viewed at the opposite end to determine the place of severance.

It is a further object of this invention to provide dissimilar colored plural light arranged in a manner to direct light through the bundle to a point of visual observation to determine the place of severance.

The objects of this invention are accomplished by placing a cutting element in intimate contact with an end surface of a bundle of fibers. A lighting means associated with cutting end of the bundle is directed in a manner to illuminate the end surface of the bundle. The opposite end surface of the bundle is viewed through a viewing device and is provided with a scale, a template, or any suitable indicator showing the desired lines of severance needed for adapting the opposite end of the fiber bundle for the purpose for which it is intended.

Subsequent to processing of the first end of the bundle the light may be transposed to the severed end of the bundle and the unsevered end will be severed in a suitable manner providing the desired result for which the bundle is intended. The scale, or template carries a plurality of lines indicating the position on the bundle for severance of the bundle. The viewing device provides the means for observation to maintain an accurate control prior to severing the segments from the bundle.

The advantages of this device will become apparent to those skilled in the art of which the following description and attached drawings clearly illustrate.

FIG. 1 is a view illustrating severing of one end of the bundle of fibers in accordance with the scale superimposed on the opposite end which is under observation.

FIG. 2 is a view of a similar device for cutting the second end of the bundle of fibers.

FIG. 3 is a scale which may be positioned on the viewing end to indicate the lines for severing the bundle.

FIG. 4 is a film on the end surface indicating a configuration suitable for controlling the finished shape of the end of the bundle.

Referring to FIG. 1, the bundle is supported in a suitable manner on both ends with an illuminator at the opposite end from the viewing means. The base 1 supports the indexing mechanism and the one end of the bundle of fibers. The indexing mechanism includes a screw 2 and a knurled knob 3 received within the plates 4 and 5. The plates 4 and 5 are fixed to the base 1. The intermediate portion of the screw supports the arm 6 for pivotal rotation about the axial center of the screw 2. A blade 7 is supported on the arm 6 and has a cutting edge which engages the planar surface 8 of the bundle of fibers 9.

The bundle 9 may be attached to the base 1 by any suitable manner. It is necessary that the lateral surfaces of the end of the bundle are not obstructed to prevent free splitting off of a segment of the bundle as the blade 7 makes the cut on the bundle. Cementing of one of the lateral surfaces permits a free splitting of the segments.

The rotational support of the sleeve 10 on screw 2 permits a pivotal movement of the blade 7 and maintains a controlled relationship between consecutive cuts for the type of use to which this device is applied. As the screw 2 is rotated the sleeve 10 is moved axially. The washers 11 and 12 prevent axial movement of the sleeve 10 relative to the screw 2.

The axial movement of the screw 2 responsive to rotation of a knurled knob 3 is read directly by the dial micrometer 13. The dial micrometer 13 is supported on the base 1 by the bracket 14. This permits incremental movement for making slices of the desired thickness from the bundle 9. The stereomicroscope 15 which views the end surface 16 on the end 17 of the bundle 9 permits slicing in accordance with the scale 18.

A suitable lighting arrangement is also provided in conjunction with the indexing mechanism and cutting means. The fiber bundles 19 and 20 form separate paths of light from the sources of light to the planar surface 8 on the end of the bundle. The blade 7 contacting the surface 8 maintains the division of the light as it is projected from the ends of the bundles 19 and 20 on the surface 8. The fiber bundle 9 is made of a plurality of fibers of extremely small diameter so that the individual fibres receiving light from both sources are substantially eliminated.

The receiving end of the bundles 19 and 20 are positioned adjacent to the dividing plate 21 which prevents light from the dissimilar sources mixing with each other. The red light from the bulb 23 is directed into the end of the bundle 19 and the blue light from the bulb 22 is directed into the bundle 20. In this manner the red and blue light passes through the bundles 19 and 20 and is maintained separate as it is received in the end surface 8 of the bundle 9.

The opposite end surface 16 of the bundle 9 is fixed relative to the frame 24. The stereomicroscope 15 is constructed and arranged for traverse movement relative to the frame upon which the bracket 25 is mounted.

A similar indexing mechanism and cutting means is illustrated in FIG. 2. The ends of the bundle 9 are transposed so that the severed end 26 receives light from the red bulb 28 and the blue bulb 29. The divider plate 30 directs the light in separate segments of the severed end 26 of the bundle 9. The light emerging from the end 31 of the bundle 9 is observed by the microscope 32. Through the use of the mircroscope 32 the precise location of a cut is determined to thereby form bundle segments containing only fibers common to both ends of the bundle segment. The efficiency of light transmission through separate slices formed of the bundle 9 is thereby greatly increased over what can be done by conventional incremental slicing of a bundle.

The scale shown in FIG. 3 illustrates the positioning of extremely narrow lines spaced relatively close to each other permitting the observation of the area intermediate the lines 33. Very fine lines may be formed by photographic means or scaling with a fine instrument. By placing lines in pairs as the pairs of lines 33 and 34 the spaces 35 and 36 intermediate the lines respectively permit observation to determine the color of the ends of the fibers in this area. The actual line to be severed on the opposite end of the bundle may be determined by the color line which is a division between red and blue fiber ends. The illumination of the opposite end of the bundle from the red and blue lights will form a division on the viewing end.

FIG. 4 illustrates a configuration 37 suitable for superposition on the end of the bundle which is viewed at the opposite end through the microscope. If the end which is being trimmed with a cutting blade is suitably mounted for rotational and traverse movement to align the cutting edge with lines forming the configuration, then a precise control of individual fibers running through the full length of the bundle may be determined. The inventor does not wish to limit the segments which are trimmed from the periphery of the end of the bundle to straight lines as any configuration of curved lines and straight lines providing a suitable configuration may be cut. An accurate determination is necessary as to where the cut should be made on a bundle to retain only the fibers which run the full length of the bundle when the bundle is finished and not include fiber ends which are not included in both end surfaces of the fiber bundle.

The operation of the device will be described in the following paragraphs. Referring to FIG. 1 the processing of the bundle as illustrated is subsequent to formation of a planar light receiving and projecting surface. The bundle 9 is fixed on both ends with the first end fixed to an indexing mechanism in a suitable manner as illustrated. The bundle illustrated is cemented to fix the relationship of the end of the bundle to the base 1. The blade 7 is rotatable about the axis of the screw 2 and the cutting edge engages the planar surface 8 of the bundle 9 for the full width of the bundle.

The lights 23 and 22 are red and blue respectively. Any dissimilar lighting combination might be used. The lights from the bulbs 22 and 23 are maintained separate by the divider 21 and is directed to the bundles 19 and 20 respectively. Any suitable separating and light directing means could provide this function. It is possible to use a single light with filters which transmit predominantly lights of a different color on the opposite sides of the blade 7. The blade 7 maintains a separation between the dissimilar colors of light and the end surface 8 receives the light. The light is then transmitted through the bundle 9 to the emergent end 16 which is viewed by the stereomicroscope 15. The mircroscope may be adjusted in any direction by a suitable adjusting means. A scale is placed on the end surface 16 to indicate parallel lines at a location which determines the position of the blade 7 at the opposite end.

When the desired slice from the bundle 9 is made the cycle is repeated by rotation of the screw 2 of which the movement is directly readable on the micrometer 13. The accurate location is indicated by the scale 18 as observed through the stereomicroscope 15. A continual sequence of slices is made to provide the desired number and shape of slices from the bundle.

As previously mentioned any suitable arrangement for trimming end surfaces of a bundle of fibers to provide the desired configuration might be accomplished in a similar manner. The configuration for example, might be such as illustrated in FIG. 4.

Once the first end of the bundle is trimmed or sliced in the manner desired the opposite end of the bundles are then transposed as indicated in FIG. 2. The divider 30 separates the two light sources 28 and 29 directing dissimilar colored light into the end of previously severed slices.

The process of severing the second end of the bundle of fibers 9 is then repeated and each slide forms a separate bundle of smaller shape and size than the bundle 9. The accuracy of the severance of the individual fibers which form a part of the emergent and immergent ends is limited only by the resolution of the fibers themselves. Theoretically, with a perfect winding of layers of fibers where each layer is in a parallel relation to the preceding and subsequent layers, a slice might be made to separate individual layers.

FIG. 3 provides a means where the ends of the individual fibers may be viewed and the separation between the two colors may be clearly distinguished as the color line is intermediate pairs of scale lines. This separation indicates the precise line at which the opposite end of the bundle is to be severed. This type of a viewing, and trimming or slicing mechanism provides a means of accurately controlling the individual fibers in a bundle to gain the highest efficiency of light transmission possible.

The above description and illustration sets forth the preferred embodiment of the invention. The attached claims define the limits of this invention.

We claim:

1. A bundle splitting device comprising means supporting the ends of a bundle of fibers, a cutting element engaging the light transmitting surface on the first end of the bundle of fibers, illuminating means illuminating the surface on the first end of the bundle indicating the cutting line on the light transmitting surface on the second end of said bundle, viewing means for viewing the position of cutting line on the second end of said bundle to thereby correlate the cutting line on both ends of the bundle.

2. A bundle splitting device comprising, bundle supporting means supporting a fiber bundle, lighting means projecting a luminous flux having a plurality of colors with the various portions forming a color line coincidental with a cutting line of a cutting element on the immergent end of the fiber bundle, viewing means viewing the color line on the emergent end of the fiber bundle simultaneously with a scale thereby correlating cutting of both ends of the bundle.

3. A bundle splitting device comprising in combination, bundle supporting means supporting a bundle of fibers having a plurality of fibers, illuminating means projecting a luminous flux having dissimilar colored light and forming a predetermined line by the adjoining portions of the dissimilar colored light, viewing means for viewing the color line from the opposite end of the fiber bundle, a severing means severing a segment of the fiber bundle in accordance with the color line produced by the illuminating means and observed by the viewing means.

4. The method of severing a fiber bundle comprising the steps, projecting a dissimilar colored luminous flux and forming a predetermined color line on the adjoining portions of the dissimilar colored luminous flux on the light immergent end of the fiber bundle, viewing the color line at the emergent end of the fiber bundle, severing a portion of the fiber bundle in accordance with the color line formed by said illuminating means as indicated at the emergent end.

5. The method of cutting a bundle of fibers comprising the steps, projecting a luminous flux on the end surface of a fiber bundle to form a predetermined line of illumination on the immergent end of the fiber bundle, viewing the illumination line on the emergent end of a fiber bundle, severing a portion of the fiber bundle in accordance with the location of the line of illumination.

6. The method of manufacturing a bundle of fibers comprising the steps, projecting a luminous flux and forming at least one linear intersecting line with the light immergent surface of a bundle of fibers, viewing the light emergent end on the second end of said bundle of fibers, cutting at least one of the surfaces with a cutting element coincidental with the line established by the luminous flux.

7. The method of cutting a lateral segment from a bundle of fibers comprising the steps, projecting a luminous flux of dissimilar color and forming a linear intersecting line of the adjoining dissimilar color portions of the flux with the light immergent surface of a bundle of fibers, viewing the light emergent surface of the bundle of fibers and the line formed by adjoining dissimilar color light, cutting at least one of the surfaces with a cutting element coincidental with the color line established by the luminous flux and thereby correlating the severance of fibers on opposing ends of said bundle of fibers.

8. A bundle splitting device comprising in combination means supporting a bundle of fibers, illuminating means directing a luminous flux producing a predetermined linear intersecting peripheral segment of the flux with the light immergent surface of the bundle of fibers, viewing means for viewing the predetermined linear lighting from the emergent end of the bundle of fibers, a cutting element cutting at least one of the surfaces of said bundle of fibers with said cutting element coincidental with the line established by the luminous flux to thereby correlate severance of common fibers on both ends of said bundle of fibers.

9. A bundle cutting device for cutting lateral segments on the bundle of fibers comprising means supporting a fiber bundle, illuminating means directing a luminous flux including dissimilar colored portions producing a predetermined configuration on the immergent surface of the bundle of fibers, a viewing means viewing the dissimilar colored configuration on the emergent surface of said bundle of fibers, a cutting element cutting at least one of the surfaces coincidental with the configuration established by the dissimilar colored luminous flux to thereby correlate severance of common fibers on both ends of said bundle of fibers.

References Cited by the Examiner

UNITED STATES PATENTS 3,016,785   1/62   Kapany.

ANDREW R. JUHASZ, *Primary Examiner.*